(12) United States Patent
Larichev

(10) Patent No.: US 8,153,198 B2
(45) Date of Patent: Apr. 10, 2012

(54) FLUOROPOLYMER SOLUTIONS, COATINGS AND COATED ARTICLES

(75) Inventor: Roman B. Larichev, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 855 days.

(21) Appl. No.: 12/124,566

(22) Filed: May 21, 2008

(65) Prior Publication Data

US 2009/0291219 A1 Nov. 26, 2009

(51) Int. Cl.
- *B05D 1/02* (2006.01)
- *B05D 1/18* (2006.01)
- *B05D 3/02* (2006.01)
- *C08K 5/03* (2006.01)

(52) U.S. Cl. .............. 427/385.5; 427/427.4; 427/430.1; 524/462

(58) Field of Classification Search ................. None
See application file for complete search history.

(56) References Cited

U.S. PATENT DOCUMENTS

| 3,350,373 | A | 10/1967 | Sianesi et al. |
| 6,248,823 | B1 | 6/2001 | Hrivnak et al. |
| 6,646,077 | B1 * | 11/2003 | Lyons ............ 526/206 |
| 6,767,626 | B2 | 7/2004 | Tuminello et al. |
| 2005/0153124 | A1 * | 7/2005 | Finn et al. ............ 428/334 |

* cited by examiner

*Primary Examiner* — Ramsey Zacharia

(57) ABSTRACT

Provided are coatable solutions of copolymers of 1,2,3,3,3-pentafluoropropylene and tetrafluoroethylene, processes for preparing coated articles, films, and coated articles.

17 Claims, 3 Drawing Sheets

DSC of Comparative Example A

FLUOROPOLYMER SOLUTIONS, COATINGS AND COATED ARTICLES

FIELD OF THE INVENTION

The present invention is directed to coatable solutions of copolymers of 1,2,3,3,3-pentafluoropropylene and tetrafluoroethylene, processes for preparing coated articles, films, and coated articles.

BACKGROUND

Sianesi et al., U.S. Pat. No. 3,350,373 discloses copolymers of 1,2,3,3,3-pentafluoropropylene and tetrafluoroethylene, a method for preparing them, and a process for melt forming shaped articles. Sianesi's polymers are crystalline polymers having 1,2,3,3,3-pentafluoropropylene comonomer concentrations of less than 20 mole percent.

Hrivnak et al., U.S. Pat. No. 6,248,823, discloses solvents for so-called amorphous fluoropolymers. Amorphous fluoropolymers include copolymers of TFE with perfluoromethylvinylether, perfluoroethylvinylether, perfluoropropylene (HFP), perfluorodimethyldioxole, perfluoro-2-(2-fluorosulfonylethoxy) propyl vinyl ether, and others. Solvents disclosed include fluorinated alkanes, fluorinated alkenes, fluorinated sulfides, hexafluorobenzene and others. Amorphous fluoropolymers are characterized by having no melting transition with a heat of fusion greater than 1 J/g as determined by differential scanning calorimetry (DSC). The HFP copolymers are ca. 48 mole percent HFP.

Tuminello et al., U.S. Pat. No. 6,767,626, discloses a method for protection of stone by preparing coated stone surfaces using substantially amorphous copolymers of hexafluoropropylene and tetrafluoroethylene.

SUMMARY

The present invention provides a solution comprising a fluoroaromatic solvent and an amorphous copolymer comprising 50 to 80 mole percent of monomer units derived from tetrafluoroethylene and 20 to 50 mole percent of monomer units derived from 1,2,3,3,3-pentafluoropropylene.

The present invention further provides a method for preparing a coated article, the method comprising contacting the surface of an article having a surface with a solution comprising a fluoroaromatic solvent and an amorphous copolymer comprising 50 to 80 mole percent of monomer units derived from tetrafluoroethylene and 20 to 50 mole percent of monomer units derived from 1,2,3,3,3-pentafluoropropylene; and, evaporating the solvent to produce a coated article.

The present invention further provides a coated article comprising an article having a surface and a coating disposed upon the surface, the coating comprising an amorphous copolymer comprising 50 to 80 mole percent of monomer units derived from tetrafluoroethylene and 20 to 50 mole percent of monomer units derived from 1,2,3,3,3-pentafluoropropylene, the coating being characterized by a thickness of $\leq 10$ micrometers.

DETAILED DESCRIPTION

Figure 1:
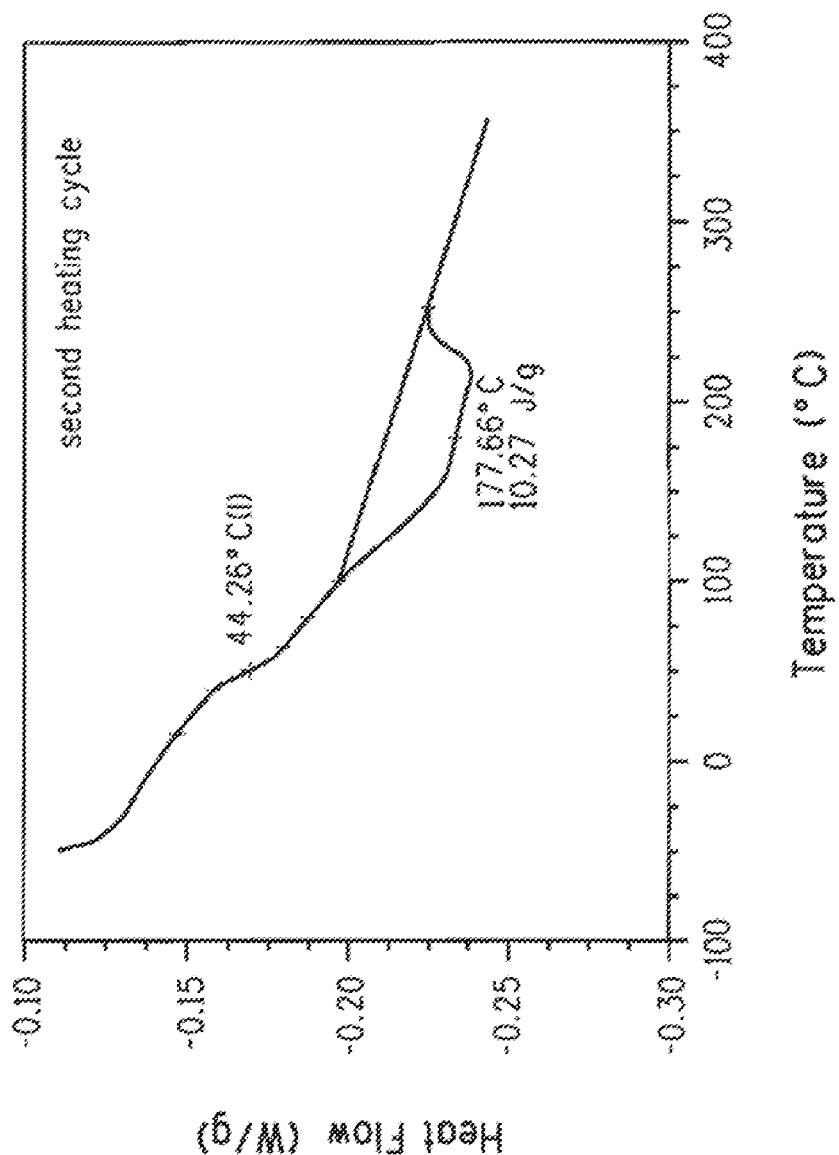
FIGS. 1-3 show the differential scanning calorimetry scans for polymers prepared in the Examples.

As used herein, the term "amorphous" refers to a polymer having no melting endotherm having a heat of fusion greater than 2 J/g as determined by differential scanning calorimetry (DSC). Amorphous copolymers of TFE with 1,2,3,3,3-pentafluoropropylene have not previously been reported.

As used herein, the term "soluble" when referring to a polymer means that the polymer combines in a liquid solvent to form a clear, homogeneous liquid solution or gel at room temperature. The manner by which the room temperature liquid solution or gel is prepared is not germane to the definition. Thus, a polymer observed to be insoluble at room temperature, may be combined with the solvent and the combination heated with stirring to cause the polymer to enter solution at an elevated temperature, forming a clear homogeneous liquid. Just so long as the solution so produced when cooled to room temperature remains clear and homogeneous, either as a liquid solution or gel, the polymer is considered soluble in the solvent "Clear and homogeneous" are determined by simple visual inspection of the specimen in a clear glass vessel.

As used herein, the term "copolymer" refers to a copolymer comprising 20 to 50 mole percent of 1,2,3,3,3-pentafluoropropylene and 50 to 80 mole percent of TFE. The term further encompasses terpolymers or other multi-polymers wherein an additional one or more monomer units derived from olefinic monomers are included in the copolymer. However, the total of all the one or more additional monomer units is preferably not more than 10 mole percent.

When a copolymer is described herein as "comprising 20 to 50 mole percent of 1,2,3,3,3-pentafluoropropylene this means that the copolymer comprises 20 to 50 mole percent of monomer units derived from 1,2,3,3,3-pentafluoropropylene upon copolymerization with TFE. Similarly, when the copolymer is described as "comprising 50-80 mole percent of TFE," what is meant is that the copolymer comprises 50-80 mole percent of monomer units derived from TFE upon copolymerization with 1,2,3,3,3-pentafluoropropylene. Similar descriptions are used herein in the same manner.

The copolymers disclosed herein are characterized by novel solubility characteristics which afford a high and unusual utility. Tetrafluoroethylene homopolymers are well-known to be virtually insoluble and intractable, partially because of high crystallinity and partially because of high molecular weight. Fluorinated copolymers of tetrafluoroethylene and other olefinic fluoromonomers such as hexafluoropropylene and perfluoropropylvinyl ether are insoluble at comonomer (i.e., non TFE) content below about 20 mole percent.

Hrivnak et al. disclose that at comonomer content of around 25 mole percent up to ca. 50 mole percent copolymers known in the art become substantially amorphous, and exhibit moderate to good solubility in a wide range of fluorinated solvents, as well as some other solvents such as hydrocarbons and supercritical $CO_2$. The copolymers disclosed herein exhibit a considerable decrease in crystallinity with increasing comonomer content. No melting endotherm having a heat of fusion greater than 2 J/g was observed in differential scanning calorimetry (DSC) of 1,2,3,3,3-pentafluoropropylene copolymers with TFE at comonomer content of 20-50 mole percent.

However, the present inventors have found that, surprisingly, solubility of the polymers disclosed herein is limited to highly fluorinated aromatic hydrocarbon solvents. Solubility in other fluorinated solvents is not observed. Some polymer swelling is sometimes observed, but a liquid solution is not formed.

The novel solubility behavior gives rise to high utility. For example, a coating of a few micrometers up to about 100 micrometers can be applied to a surface from solution in, e.g., hexafluorobenzene, to protect a surface. Preferably the coating is ≦10 micrometers in thickness. The surface can then be exposed to an environment in which non-aromatic fluorinated solvents are employed, for example in cleaning, without significant degradation of the protective coating.

As a further example, multi-layer fluoropolymer coatings or laminates of fluoropolymers can be fabricated by applying a first layer of a coating to a substrate from a hexafluorobenzene solution of an embodiment of the polymer, followed by drying. A second layer of the coating of a second polymer, the second polymer not being, is then applied from a solution thereof whereof the solvent is not a fluorinated aromatic hydrocarbon so that the first layer of the coating is undisturbed by the application of the second layer.

Accordingly, the present invention provides, in one embodiment, a solution comprising a fluoroaromatic solvent and an amorphous copolymer comprising 50 to 80 mole percent of monomer units derived from tetrafluoroethylene and 20 to 50 mole percent of monomer units derived from 1,2,3,3,3-pentafluoropropylene. Preferably the copolymer comprises 25 to 50 mole percent of monomer units derived from 1,2,3,3,3-pentafluoropropylene. Most preferably the copolymer comprises 30 to 45 mole percent of monomer units derived from 1,2,3,3,3-pentafluoropropylene.

The copolymers can be prepared according to methods known in the art. The composition of the copolymer can be varied by varying the composition of the monomeric mixture and the temperature at which the polymerization reaction is conducted. Generally, higher reaction temperatures favor incorporation of a higher proportion of 1,2,3,3,3-pentafluoropropylene units into the copolymer.

It is known that 1,2,3,3,3-pentafluoropropylene is less reactive in copolymerization than TFE under a given set of conditions. In order to achieve the desirably high 1,2,3,3,3-pentafluoropropylene incorporation into the copolymer, the polymerization mixture preferably has a higher content of the 1, 2,3,3,3-pentafluoropropylene than that which is desired in the final product. Thus, the monomer concentration of 1,2,3,3,3-pentafluoropropylene preferably ranges from about 50 mole percent to about 85 mole percent, and the concentration of TFE ranges from about 15 mole percent to about 50 mole percent.

The fluorinated copolymers can be prepared at temperatures ranging from about −30° C. to about 200° C., under pressures varying from atmospheric to above 300 atm., and in the presence of free-radical polymerization initiators. The preferred reaction temperature and pressure will depend, however, on the type of catalytic system employed. The polymerization can be carried out in an aqueous medium if desired, including polymerization in an aqueous suspension, aqueous emulsion, polymerization in bulk or in solution.

When polymerization is carried out in non-aqueous solution, inert solvents that do not contain C—H bonds are preferred. Suitable inert solvents include perhalogenated or perfluorinated compounds that are liquid under operating conditions, such as perfluorocyclobutane, perfluorodimethylcyclobutane, perfluoropropylpyrane, or tetrafluorodichloroethane. Suitable initiators include perhalogenated or perfluorinated peroxy compounds such as peroxides of trichloroacetic acid, heptafluorobutyric acid, trifluoroacetic acid, pentafluoropropionic acid, or perfluorocaprylic acid. In addition, peroxides of the ω-hydroperfluoro acids having the general formula $H(CF_2)_n$—COOH wherein n ranges from 1 to 8 can be used.

In aqueous polymerization, suitable initiators include water-soluble organic peroxides, diperoxides or hydroperoxides, or inorganic peroxides. Suitable inorganic peroxides include ammonium or alkaline and alkaline earth metals persulphates, perphosphates, perborates, barium peroxide, sodium peroxide, or hydrogen peroxide. Suitable organic peroxides include benzoyl peroxide, p. chlorobenzoyl peroxide, 2,4-dichlorobenzoyl peroxide, acetyl peroxide, trichloroacetyl, peroxide, lauroyl peroxide, succinyl peroxide, di-t.-butyl peroxide, peroxides and hydroperoxides of methylethylketone and of cyclohexanone, t-butyl perbenzoate, t-butyl-hydroperoxide, or cumyl hydroperoxide. Aliphatic azo-compounds can also be employed, such as alpha, alpha'azobis (isobutyronitrile), alpha, alpha'-azobis(alpha-methyl-gamma-carboxybutyronitrile), alpha, alpha'-azobis(alpha, gamma-dimethyl-gamma-carboxy-valeronitrile), alpha, alpha'-azobis(alpha-propyl-gamma-carboxybutyronitrile).

Other ingredients that can be used in aqueous polymerization include emulsifying agents, activators, accelerators, modifiers, buffers, etc. Emulsifying agents include alkali, alkaline earth or ammonium salts of perhalogenated or ω-hydroperhalogenated fatty acids having 6 to 20 carbons atoms. Suitable activators include sodium bisulphite, metabisulphite and thiosulphate or, in general, any water-soluble reducing substance. The accelerators include salts of metals occurring in various valence states, such as soluble salts of iron, copper, silver, etc. The modifiers include mercaptans or the aliphatic halocarbons which may be employed to regulate the polymerization reaction. Suitable buffering agents include sodium or potassium mono- or bi-phosphates or mixtures thereof, sodium metaborate, or borax.

When the copolymerization reaction is carried out in water, it is preferred to operate at a temperature ranging from about 5° C. to 100° C. and more preferably at a temperature ranging from about 10° C. to 90° C. under a pressure ranging from atmospheric to 200 atm.

A solution can be formed by combining the amorphous copolymer after drying with a fluoroaromatic solvent while stirring, at a copolymer concentration of 1% to 20% by weight of the total weight of the solution. The degree of solubility depends upon the content in the polymer of the 1,2,3,3,3-polypropylene comonomer, with greater comonomer content corresponding to higher solubility. Preferably the polymer concentration is 5-15% by weight of the total weight of the solution. Dissolution is normally achieved at room temperature by stirring for about 30 minutes. It may be beneficial to heat the combination to about 60° C. while stirring to effect dissolution. In such case, when cooled, the solution so formed may form a gel rather than a pourable liquid.

Suitable fluoroaromatic solvents include but are not limited to hexafluorobenzene, pentafluorobenzene, and octafluorotoluene. Hexafluorobenzene is preferred.

Another embodiment of the present invention is a method for preparing a coated article, the method comprising providing an article having a surface for coating, and contacting the surface with a solution comprising a fluoroaromatic solvent and an amorphous copolymer comprising 50 to 80 mole percent of monomer units derived from tetrafluoroethylene and 20 to 50 mole percent of monomer units derived from 1,2,3,3,3-pentafluoropropylene; and, evaporating the solvent to produce a coated article. The solution comprises 1-20% by weight of the amorphous copolymer, preferably 5-15% by weight, based on the total weight of the solution.

To obtain a spreadable liquid suitable for making a coating, the viscosity of the solution can be adjusted to meet the requirements of the method by which the solution is applied to the surface. In one embodiment the solution is applied to the surface of the article at room temperature. In another embodiment, the solution is applied to the surface at an elevated temperature. In still another embodiment, the solution is applied to the surface at a temperature below room temperature.

The manner in which the surface is contacted with the solution is not limited. One method is to use a doctor blade to spread the solution on a flat surface at a uniform thickness. Other suitable methods include spray coating, dip coating, brushing or rolling, and other such methods as are commonly employed in the art for coating the surface of articles with polymer solutions.

In a further embodiment of the present invention there is provided a coated article, comprising an article having a surface and a coating disposed upon the surface, the coating comprising an amorphous copolymer comprising 50 to 80 mole percent of monomer units derived from tetrafluoroethylene and 20 to 50 mole percent of monomer units derived from 1,2,3,3,3-pentafluoropropylene. In preferred embodiments the coating has a thickness of 10 micrometers or less.

Generally, because of difficulty handling and melt strength melt extrusion of polymers is commonly used in the art to produce films of a thickness of ca. 25 micrometers or greater. Although thinner melt extruded films are known, they are not typical. Melt coating is generally limited to the coating of flat surfaces. Solution coating is not limited to surface of any particular shape, and is particularly well-suited for preparation of coating that are less than or equal to 10 micrometers in thickness.

The coated articles have surfaces that are protected from contamination, and from a wide variety of solvents because of the limited solubility of the coating polymer. In that regard, the coated articles can be disposed to receive the application of additional layers from solution that contains a solvent other than a fluoroaromatic solvent.

EXAMPLES

Example 1

5 g of a 20% solution of ammonium perfluorooctanoate was diluted to 100 mL with deionized water and combined with 0.20 g of ammonium persulfate (Sigma-Aldrich) (0.20 g) in a Hastelloy® C 400 $cm^3$ autoclave. The autoclave was chilled to 5° C., evacuated, pressured with nitrogen to 400 psi and vented off. The pressuring and venting were repeated and a vacuum was then applied to the interior of the autoclave. The autoclave was then chilled to −30° C. 56 g of 1,2,3,3,3-pentafluoropropylene prepared in the manner described by Sianesi et al., op.cit. was condensed in followed by pressuring with 14 g of TFE) and sealing. The sealed autoclave was heated to 70° C. and held for 16 hours. During that time the pressure gradually decreased from 377 psi to 321 psi. The autoclave was cooled to room temperature, and the excess gases were vented off. A clear aqueous solution was removed from the reactor and frozen in dry ice for at least 4 hours. The frozen solution was then allowed to thaw and then filtered through #1 Whatman filter paper. The white residue was suspended in 500 ml of deionized water, stirred for 30 minutes, filtered again, and dried on the filter by pulling air through. The resulting polymeric residue was further dried in vacuum oven at 50° C. for 12 hours. 14.8 g of white spongy polymer was obtained after drying. The $^{19}F$ NMR of the melted polymer (at 160° C.) showed four broad peaks which upon integration showed that the polymer contained 27 mole percent of 1,2,3,3,3-pentafluoropropylene.

180 mg of the thus prepared polymer was dissolved in 3.3 g of hexafluorobenzene (Aldrich) by stirring at room temperature for 30 minutes to give a clear, homogeneous 5 wt.-% solution. The thus prepared solution was cast on a regular glass plate using a 0.005 in. (127.5 micrometer) Doctor's blade. After evaporation of the solvent a coating 1-2 micrometers thick remained on the glass plate.

Attempts to prepare similar solutions using other solvents were unsuccessful. The mixtures made were neither clear nor homogeneous. Solvents employed were dichloromethane (OmniSolve), toluene (OmniSolv), acetone (EMD), Vertrel XF (2,3-dihydrodecafluoropentane—DuPont), Novec HFE 7500 (3-ethoxy-1,1,1,2,3,4,4,5,5,6,6,6-dodecafluoro-2-trifluoromethyl-hexane—Synquest).

0.5 g of polymer powder was placed between sheets of Kapton® Polyimide Film to form a sandwich. The sandwich so formed was placed between the platens of a hydraulic press (Pasadena Hydraulics) and held at contact pressure for 5 minutes at 120° C. After the 5 minute pre-heat, the force on the press was increased to 15,000 lbs. and held for 3 minutes. Then the press was cooled to 60° C. and the pressure was released. A film approximately 75 micrometers in thickness) was obtained. A second specimen was prepared under identical conditions except that the temperature was 135° C. and the resulting film was approximately 65 micrometers thick. In both cases, the films were clear, homogeneous, ductile and tough.

Example 2

The materials and procedures of Example 1 were repeated except that 56 g of 1,2,3,3,3-pentafluoropropylene and 9 g of TFE were used. During the polymerization the pressure decreased from 336 psi to 318 psi. 5.6 g of dry polymer were obtained. The $^{19}F$ NMR of the melted polymer (at 115° C.) showed four broad peaks which upon integration showed that the polymer contained 36.5 mole percent of 1,2,3,3,3-pentafluoropropylene.

500 mg of the thus prepared polymer was dissolved in 3.3 g of hexafluorobenzene by stirring at room temperature for 30 minutes to give a clear, homogeneous 13 wt-% solution.

Attempts to prepare similar solutions using other solvents were unsuccessful. The mixtures made were neither clear nor homogeneous. Solvents employed were dichloromethane (OmniSolve), toluene (OmniSolv), acetone (EMD), Vertrel XF (2,3-dihydrodecafluoropentane—DuPont), Novec HFE 7500 (3-ethoxy-1,1,1,2,3,4,4,5,5,6,6,6-dodecafluoro-2-trifluoromethyl-hexane—Synquest). The last two fluorinated solvents made the polymer look like an oil, which sticks to the glass walls of the vessel, but did not form a solution.

Example 3

The materials and procedures of Example 1 were repeated except that 46 g of 1,2,3,3,3-pentafluoropropylene and 31 g of TFE were used and the autoclave was heated to 80° C. for ten hours. During the polymerization the pressure decreased from 530 psi to 367 psi. 29.3 g of dry polymer were obtained. The $^{19}F$ NMR of the melted polymer (at 115° C.) showed four broad peaks which upon integration showed that the polymer contained 20 mole percent of 1,2,3,3,3-pentafluoropropylene.

The polymer so prepared did not dissolve in hexafluorobenzene at room temperature to any significant extent, but at 60° C. 200 mg dissolved fairly easily in 2 mL of hexafluorobenzene to give a clear solution. Upon cooling the solution down to room temperature it became a gel.

Comparative Example A and Examples 4 and 5

In order to identify a melting endotherm and determine the heat of fusion, the following procedure was followed. A 7-10 mg of specimen was crimped in a standard sealed aluminum DSC pan. The specimen was placed in a TA Instruments model Q2000 DSC and heated rapidly (ca. 20 C.°/min) to a temperature in the range of 260-320° C. and held at temperature for 3 minutes. followed by cooling to ca. 0° C. The specimen was then reheated to the maximum temperature of 260-320° C. at 10° C./min rate with the aid of a mechanical cooler for temperature control, and data was recorded. The location of the melting endotherm, where one existed, was determined visually, and the heat of fusion determined from the weight normalized integral of the melting endotherm.

Comparative Example A

The procedures of Example 1 were repeated except that 49 g of 1,2,3,3,3-pentafluoropropylene and 26 g of TFE were used and the autoclave was heated to 80° C. for ten hours. During the polymerization the pressure decreased from 465 psi to 445 psi. 8.6 g of dry polymer were obtained. A DSC curve obtained between ca. 0° C. and 300° C. exhibited a broad shallow endotherm with a heat of fusion of ca. 6 J/g indicating a small amount of crystallinity. The $^{19}$F NMR of the melted polymer (at 115° C.) showed four broad peaks which upon integration showed that the polymer contained 17.5 mole percent of 1,2,3,3,3-pentafluoropropylene.

The polymer did not dissolve in hexafluorobenzene at room temperature. 100 mg of the polymer were suspended in 4 mL hexafluorobenzene (4 mL) and heated to 60° C. a clear solution was not obtained even on prolonged (4 hours) stirring.

FIG. 1 shows the DSC results obtained according to the method described above. A well defined endotherm was identified corresponding to a melting transition at 177.66° C., and a heat of fusion of ca 10 J/g.

Example 4

The materials and procedures of Example 1 were replicated except that the ratio of 1,2,3,3,3-pentafluoropropylene to TFE was slightly higher to give a polymer containing 30 mol-% of monomer units derived from 1,2,3,3,3-pentafluoropropylene.

Figure 2:
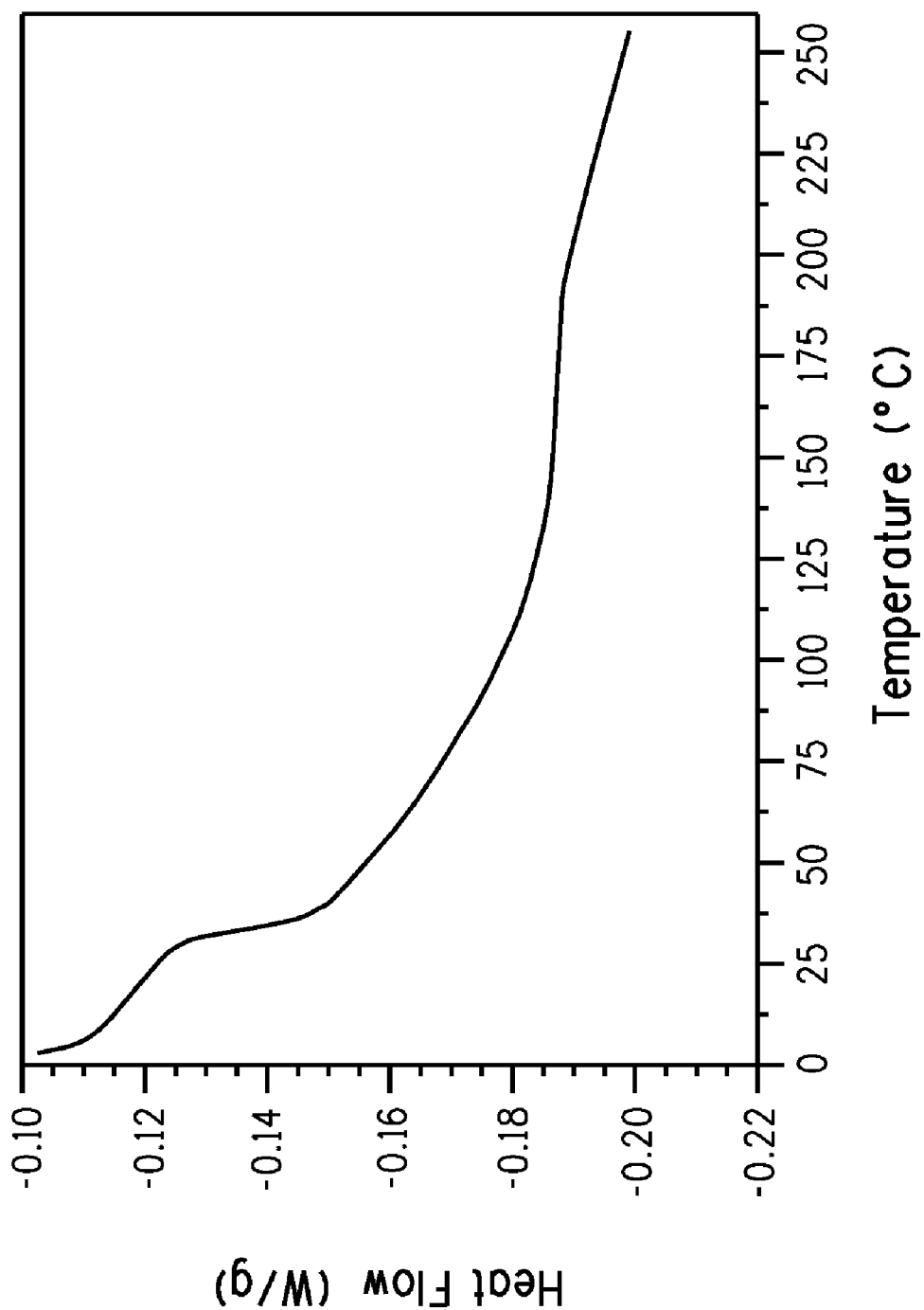

FIG. 2 shows the DSC results obtained. No melting endotherm could be discerned.

Example 5

The materials and procedures of Example 1 were replicated except that the ratio of 1,2,3,3,3-pentafluoropropylene to TFE was slightly higher to give a polymer containing 40 mol-% of monomer units derived from 1,2,3,3,3-pentafluoropropylene.

Figure 3:
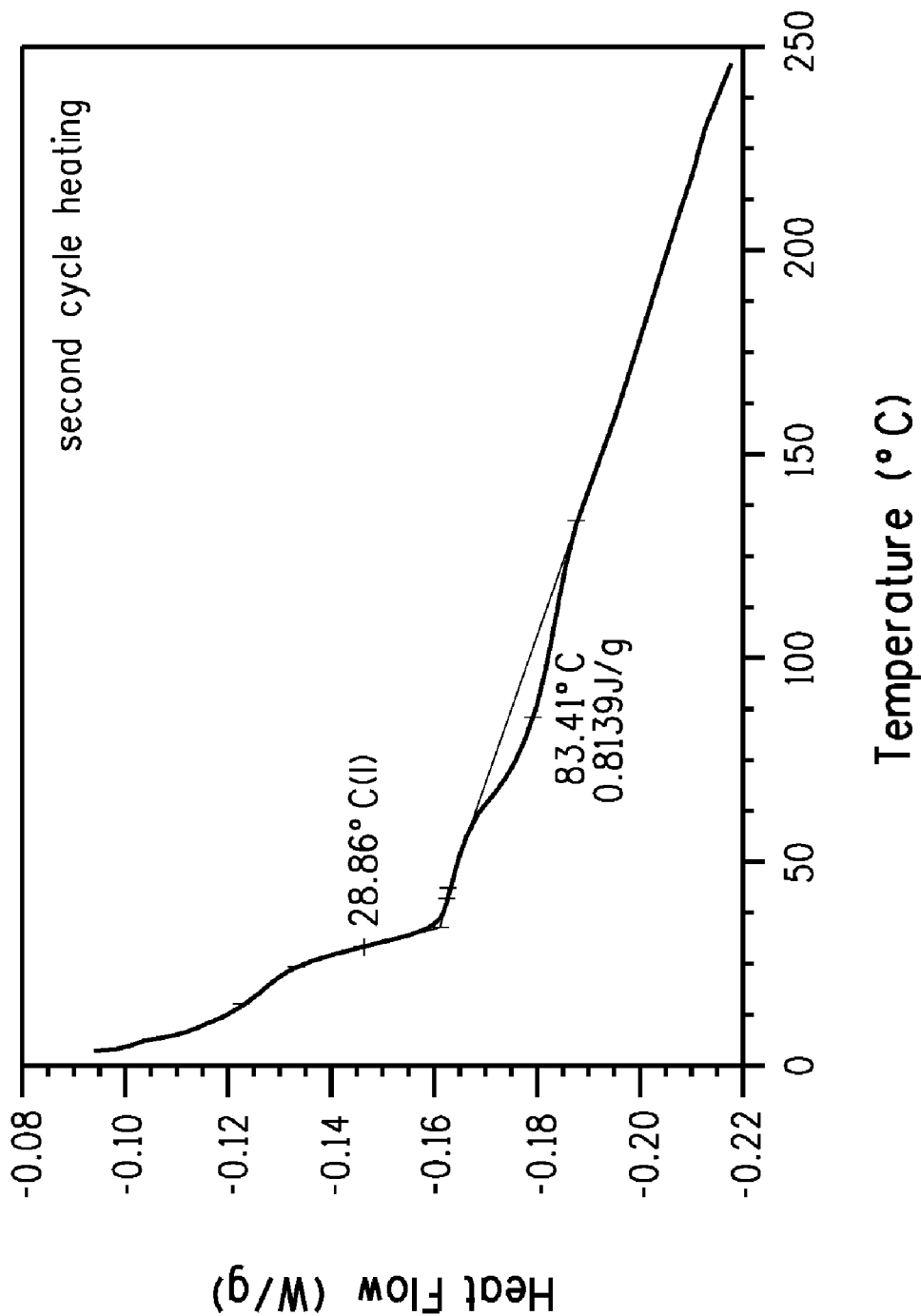

FIG. 3 shows the DSC results obtained. A very small melting endotherm associated with a crystalline melting point of 83° C. might be an artifact. The associated heat of fusion was 0.7 J/g.

What is claimed is:

1. A solution comprising a solvent and an amorphous copolymer, the amorphous copolymer comprising 50 to 80 mole percent of monomer units derived from tetrafluoroethylene and 20 to 50 mole percent of monomer units derived from 1,2,3,3,3-pentafluoropropylene, and wherein solubility of the copolymer is limited to fluoroaromatic hydrocarbons.

2. The solution of claim 1 wherein the amorphous copolymer comprises 25 to 50 mole percent of monomer units derived from 1,2,3,3,3-pentafluoropropylene.

3. The solution of claim 2 wherein the amorphous copolymer comprises 30 to 45 mole percent of monomer units derived from 1,2,3,3,3-pentafluoropropylene.

4. The solution of claim 1 wherein the amorphous copolymer further comprises up to 10 mole percent of one or more additional monomer units derived from olefinic monomers.

5. The solution of claim 1 wherein the amorphous fluoropolymer concentration is 1% to 20% by weight of the total weight of the solution.

6. The solution of claim 5 wherein the amorphous fluoropolymer concentration is 5% to 15% by weight of the total weight of the solution.

7. The solution of claim 1 wherein the fluoroaromatic solvent is hexafluorobenzene.

8. A method for preparing a coated article, the method comprising providing an article having a surface; contacting the surface of the article with a solution comprising a fluoroaromatic hydrocarbon and an amorphous copolymer comprising 50 to 80 mole percent of monomer units derived from tetrafluoroethylene and 20 to 50 mole percent of monomer units derived from 1,2,3,3,3-pentafluoropropylene; and, wherein the solubility of the copolymer is limited to fluoroaromatic hydrocarbons evaporating the solvent to produce a coated article.

9. The method of claim 8 wherein the amorphous copolymer comprises 25 to 50 mole percent of monomer units derived from 1,2,3,3,3-pentafluoropropylene.

10. The method of claim 9 wherein the amorphous copolymer comprises 30 to 45 mole percent of monomer units derived from 1,2,3,3,3-pentafluoropropylene.

11. The method of claim 8 wherein the amorphous copolymer further comprises up to 10 mole percent of one or more additional monomer units derived from olefinic monomers.

12. The method of claim 8 wherein the amorphous fluoropolymer concentration is 1% to 20% by weight of the total.

13. The method of claim 12 wherein the amorphous fluoropolymer concentration is 5% to 15% by weight of the total.

14. The method of claim 8 wherein the fluoroaromatic hydrocarbon is hexafluorobenzene.

15. The method of claim 8 wherein contacting the surface is effected by use of a doctor blade on a flat surface.

16. The method of claim 8 wherein contacting the surface is effected by use of spray coating.

17. The method of claim 8 wherein contacting the surface is effected by dip-coating.

* * * * *